United States Patent [19]

Hill

[11] Patent Number: 4,573,771

[45] Date of Patent: Mar. 4, 1986

[54] MICROSCOPE ADJUSTMENT APPARATUS

[75] Inventor: Arthur T. Hill, Williamsville, N.Y.

[73] Assignee: Warner-Lambert Technologies, Inc., Morris Plains, N.J.

[21] Appl. No.: 627,318

[22] Filed: Jul. 2, 1984

[51] Int. Cl.[4] .................. G05G 11/00; F16H 37/06
[52] U.S. Cl. .................................. 350/521; 74/479; 74/665 B
[58] Field of Search ............... 350/521, 530, 518, 520; 74/479, 665 B, 10.54

[56] References Cited

U.S. PATENT DOCUMENTS 2,421,126  5/1947  Ott ........................................ 350/521

FOREIGN PATENT DOCUMENTS 1109399  6/1961  Fed. Rep. of Germany ...... 350/521
14429  3/1971  Japan .................................. 350/521

Primary Examiner—Jon W. Henry
Attorney, Agent, or Firm—Alan H. Spencer; Stephen Raines

[57] ABSTRACT

In a microscope, a nosepiece support assembly and a coarse and fine adjustment mechanism in direct operative control of the support assembly, the support assembly including a nosepiece mounting carriage with a depending rod rigid therewith and mounting a cam follower which rides on the edge of a cam, rotation of which is controlled by the adjustment mechanism. The adjustment mechanism in turn includes a reduction gear assembly utilizing dual gear trains and mounted to a cam-mounting shaft externally of the frame of the microscope and housed within a coarse adjustment handwheel for immediate access thereto. One of the gear trains incorporates a compound gear having a torsion spring between the individual gears to enhance gear train interengagement throughout the gear assembly.

20 Claims, 5 Drawing Figures

MICROSCOPE ADJUSTMENT APPARATUS

BACKGROUND OF THE INVENTION

The invention relates to microscopes, and is more particularly concerned with the apparatus involved in the focusing of microscopes, including nosepiece support assemblies, adjustment mechanisms, combining coarse and fine adjustment means for manipulation of a nosepiece support assembly, and gear train systems as a component of the adjustment mechanisms.

Microscope adjustment systems commonly provide mechanisms for adjustment of the nosepiece relative to the stage which mechanisms incorporate both coarse and fine adjustment means, in many instances, controlling a shaft-mounted cam associated with linkage components which translate rotational movement of the cam into vertical adjustment of the nosepiece. Examples of such systems will be noted in the following patents:

| 3,135,817 | Wrigglesworth et al |
| 3,260,157 | Boughton |
| 3,768,885 | Boughton et al |

SUMMARY OF THE INVENTION

The present invention is concerned with an adjustment system for microscopes which constitutes a significant advance over prior art systems in simplicity of construction, manner of operation and nosepiece adjustment, and most particularly in the ease of access to the operating components for purposes of servicing, repair or replacement.

Briefly, the vernier or fine adjustment utilizes a reduction gear train system including dual parallel gear trains mounted as a unit within a gear box. The gear box, as opposed to conventional microscope construction, mounts externally of the arm assembly on an arm-traversing cam mounting shaft. The cam will be mounted, as is usual, internally within the arm assembly for engagement with the internally positioned nosepiece support assembly.

It is significant that one of the dual gear trains incorporates a compound gear formed of independent reduction and pinion gears with an interposed coiled torsion spring acting to rotationally bias the two gears in opposite directions as a means for preventing backlash within the gear trains and reducing lost motion, thus avoiding the necessity of highly precisioned formed gears. Similarly, the use of a spring loaded compound gear allows for an automatic accommodation of the entire gear train system to a degree of normal wear.

The externally mounted gear box will itself be directly received within the coarse adjustment handwheel which will in effect provide a readily removable housing therefor. The assembly will be completed by an outer vernier adjustment handwheel. Assembled in this manner, access to the gear trains for servicing, replacement, or the like, can be accomplished both simply and rapidly by a sequential removal of the handwheels. There is no longer any necessity for completely disassembling the microscope, changing the nosepiece adjustment, or otherwise disrupting a microscope setup. Ideally, any downtime of the microscope can be substantially completely eliminated by merely having at hand a replacement gear box.

The adjustment system includes a nosepiece support having a horizontal carriage mounted within the microscope arm assembly for vertical guided movement in response to vertical movement of an elongated rigid rod affixed to the carriage. The rod, in turn, is in operative engagement with the cam. The nosepiece support provides for a direct vertical adjustment in response to rotation of the cam and without reliance on interposed pivoting linkages.

Additional objects and advantages of the invention will become apparent from the details of construction and manner of use of the invention as more fully hereinafter described and claimed.

DESCRIPTION OF PREFERRED EMBODIMENT

Figure 1:
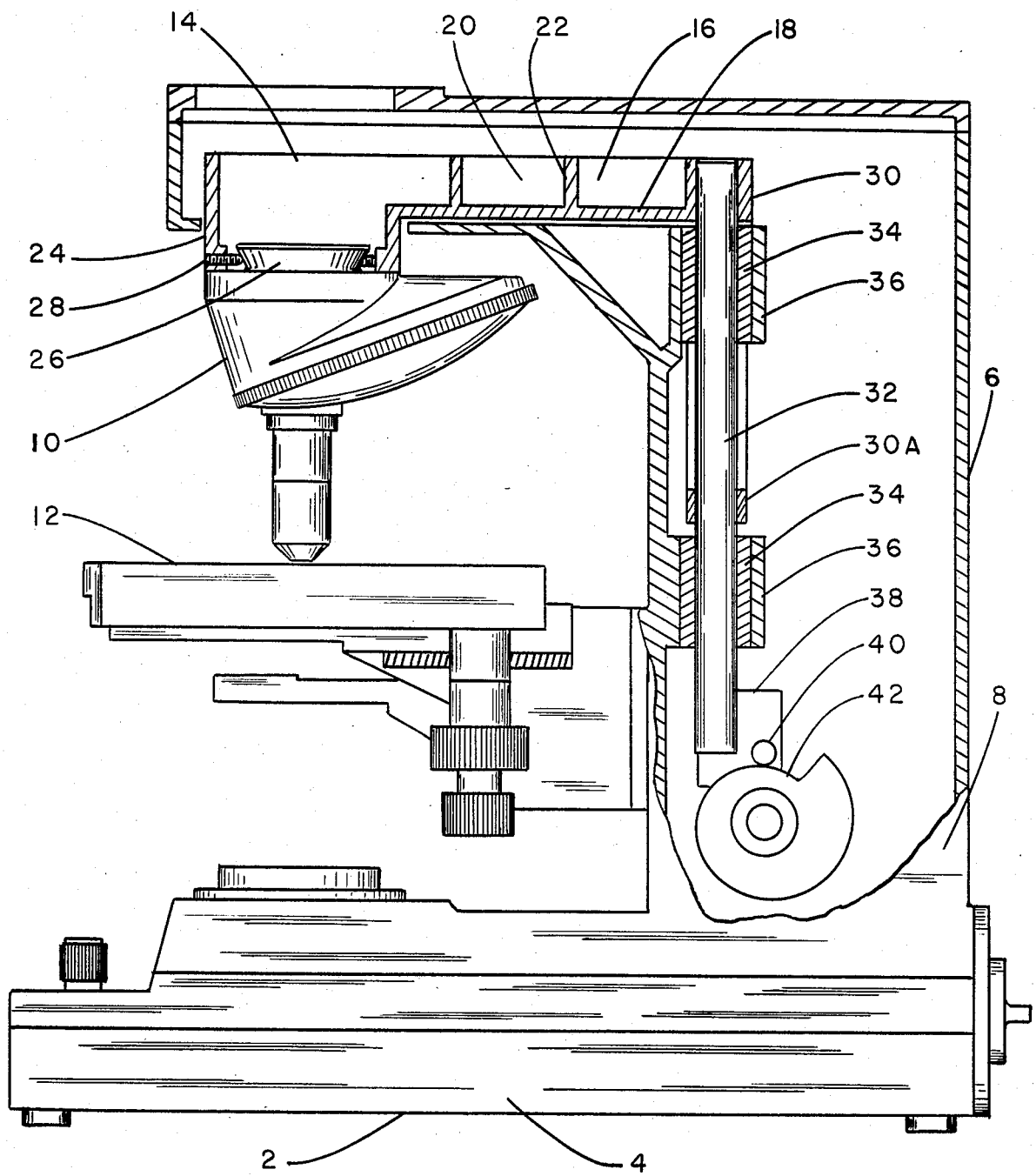
FIG. 1 is a side elevational view of a microscope incorporating the features of the present invention, portions thereof being broken away for purposes of illustration.

Referring now more specifically to the drawings, reference numeral 2 designates a microscope incorporating the features of the invention. This microscope includes a base 4 with a support arm 6 extending upwardly from the base, the base 4 and support arm 6 combining to form the microscope frame 8. The microscope 2 also will include, mounted to the frame, one or more eyepieces (not illustrated), a nosepiece 10 and a stage 12 therebelow.

The nosepiece 10 is mounted for vertical adjustment through a support or support system 14 received within the support arm 6. This support system 14 includes a horizontal carriage, within a horizontal extension of the support arm, positioned in generally parallel upwardly spaced overlying relation to the base 4. The carriage 16 basically comprises a planar panel member 18 with an upstanding peripheral wall 20 and a reinforcing grid of integral upstanding ribs 22.

A cylindrical boss 24 depends from the outer end portion of the carriage 16 for a telescopic reception of the upper portion of the nosepiece 10 therein. For retention of the nosepiece, it is proposed that an undercut shoulder or dovetail configuration 26 be defined about the boss-received portion of the nosepiece with the boss mounting three selectively adjustable retaining screws 28 engageable within the dovetail, preferably in a manner as to allow for a rotational adjustment and centration of the nosepiece to the optical path.

The second end of the carriage 16, aligned over the vertical portion of the arm assembly 6, includes two vertically directed integral split sleeves 30 and 30A which receive and rigidly clamp to the upper end portion of a vertical rod or shaft 32. The rod 32 depends from the carriage 16 and is rotatably received within a pair of vertically spaced sleeve bearings 34, each mounted within split sleeves 36 integrally formed with an adjoining portion of the frame 8. A block 38 is mounted rigid with the lower end of the rod 32 and in turn mounts a laterally offset cam follower 40 which rides on the upper edge of cam 42 and is retained in following relation thereto by the weight of the support system 14. Pin 44 projecting laterally from block 38 loosely enters groove 46 on the lateral face of cam 42 as a safety precaution, allowing and limiting the amount cam roller 40 can lift off of cam 42 when the downward movement of the carriage 16 is impeded for any reason.

Figure 3:
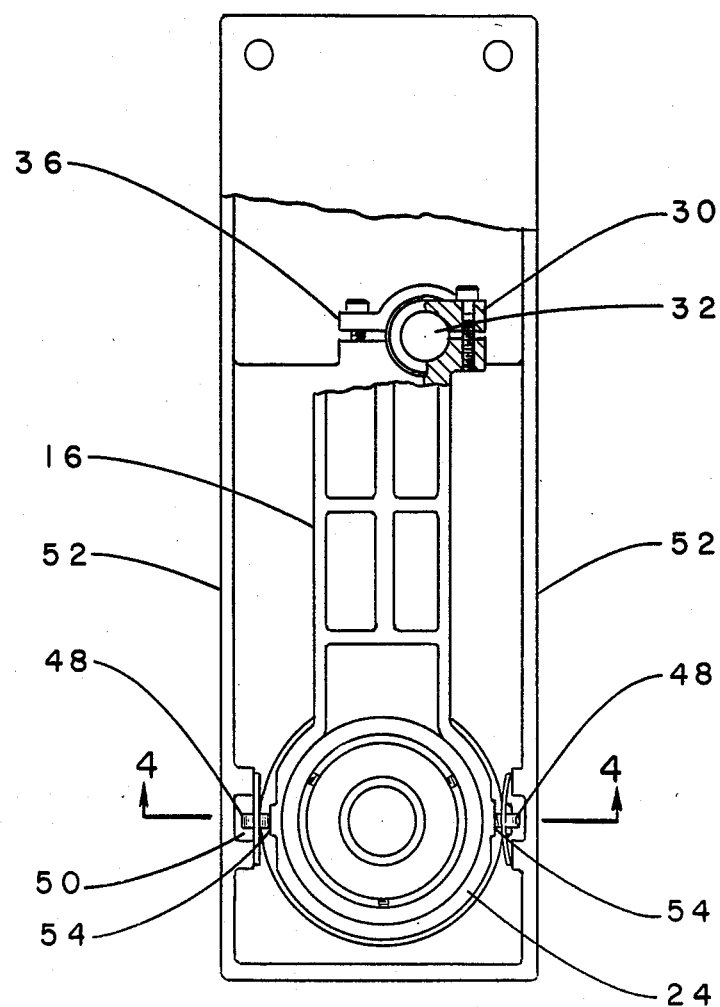
FIG. 3 is a top plan view of the microscope with a portion of the top wall of the arm assembly removed.
Figure 4:
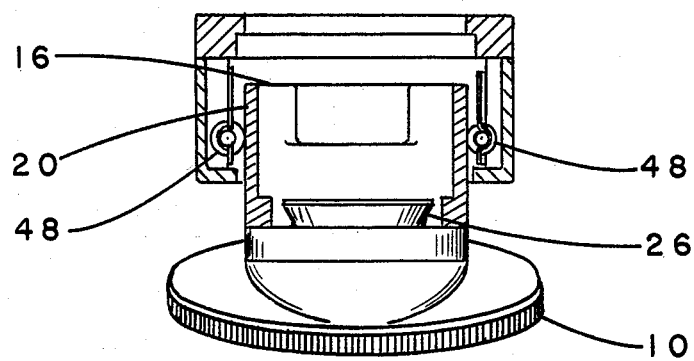
FIG. 4 is a transverse section taken generally in line 4—4 of FIG. 3.

As will be appreciated, the support or support system 14 for the nosepiece 10, responsive to rotation of the cam 42, adjusts or shifts vertically without pivotal movement and as an integral rigid unit as detailed in FIGS. 3 and 4. In order to assist this vertical adjustment and maintain lateral stability for the remote, nosepiece-supporting end of the carriage 16, a pair of opposed guide rollers 48 mount within vertical channels 50 on the opposed walls 52 of the horizontal portion of the support arm assembly. One of rollers 48, noting FIGS. 3 and 4 will normally be spring-loaded, opposing other fixed roller 48, thereby providing a fixed position for the cylindrical portion 24 of the carriage 16 with both rollers 48 engaging against flats 54 on the aligned portions of the carriage 16.

Figure 2:
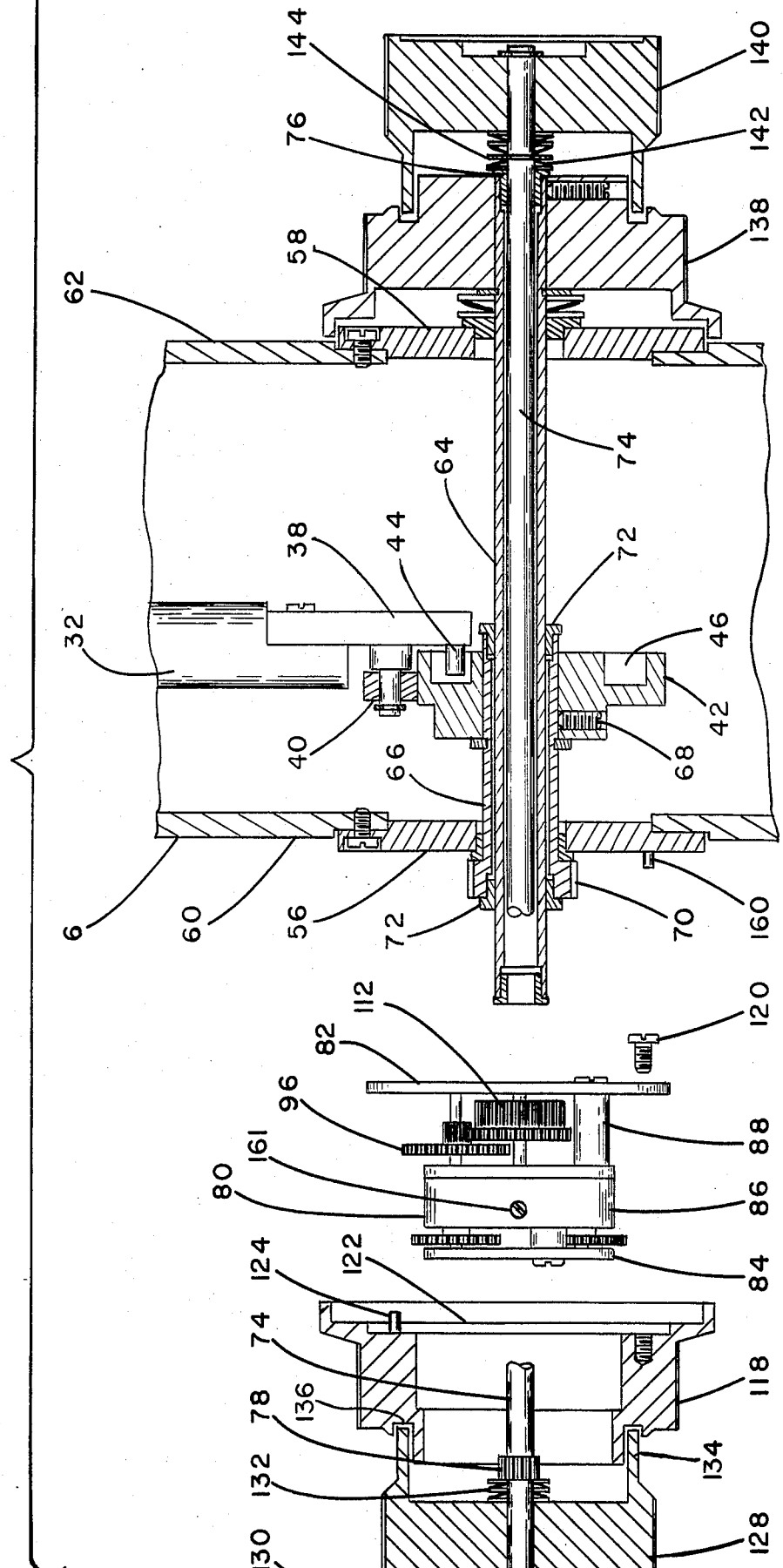
FIG. 2 is an enlarged transverse sectional view through the coarse and fine adjustment mechanism with the handwheels and gear box outwardly positioned.
Figure 5:
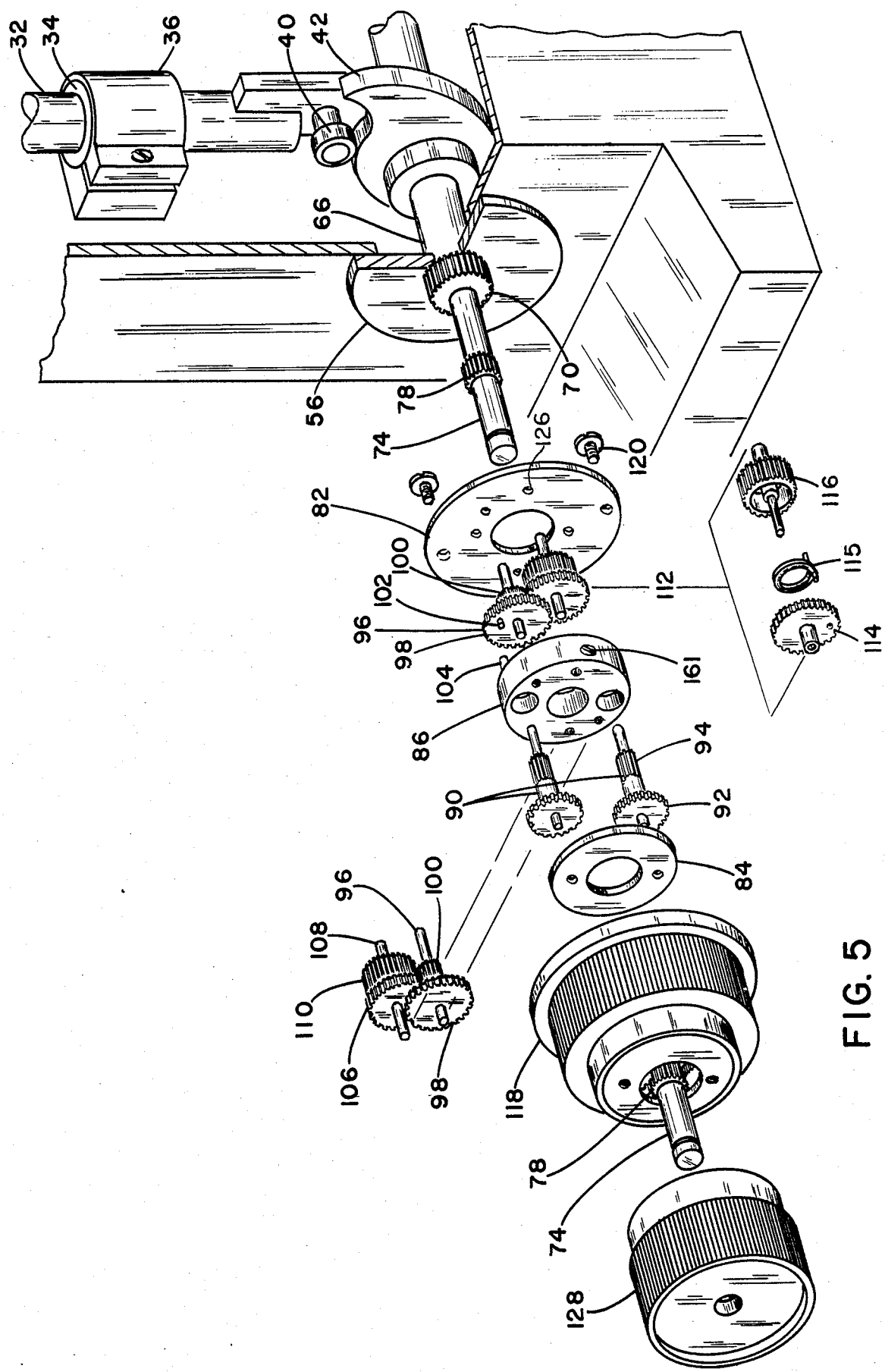
FIG. 5 is an exploded perspective view of the components of the coarse and fine adjustment mechanism.

Referring now to FIG. 2, a sectional view is shown of the adjustment mechanism, including cam 42, and its association with the rod 32 of the support system. Attention is also directed to FIG. 5 wherein the components of the adjustment mechanism are detailed. The adjustment system mounts transversely through the support arm 6 and, in particular, between and through opposed mounting plates 56 and 58 in opposed arm walls 60 and 62 respectively.

An elongate quill shaft 64 traverses the support arm and projects outwardly of the opposed wall mounting plates 56 and 58. A relatively shorter cam shaft 66 is received over quill shaft 64 and extends through mounting plate 56. The inner portion of the cam shaft 66 within the support arm assembly mounts the cam 42, locked thereto by appropriate means such as set screw 68. The outer end of cam shaft 66, outward of wall 60 and mounting plate 56, has an integrally formed gear 70 thereon. Two flanged bearings 72 are pressed into opposed ends of the cam shaft 66 and are free to rotate on quill shaft 64. An elongate central shaft 74, defining the gear train system drive shaft, is rotatably received through the quill shaft 64 and projects beyond the opposed outer end portions thereof. Appropriate bushings, as at 76, may be provided. The end portion of the drive shaft 74, beyond wall 60, includes an integral drive pinion 78 immediately outward of the corresponding end of quill shaft 64.

Attention is now directed to the construction illustrated to the left in FIG. 2, at and beyond the wall 60 and mounting plate 56. This construction, detailed in FIG. 5, includes a gear box assembly 80 particularly adapted to mount as a unit on the exposed shaft end portions and in engagement with cam gear 70 and drive gear 78. The gear box asembly 80 includes inner and outer gear box plates 82 and 84, an intermediate spacer block 86 and spacer posts 88 between the block 86 and inner plate 82.

The gear train system comprises dual generally duplicate gear trains including a first pair of compound gears 90, each having a reduction gear 92 adjacent outer gear box plate 84 and an inwardly extending elongate pinion gear 94 which is freely rotatably received through spacer block 86 and extends inwardly thereof. The compound gears 90 mount on elongate shafts, the ends of which are received in the opposed box plates 82 and 84, and are so oriented as to drivingly engage the reduction gears 92 with the drive gear 78 of shaft 74.

Inward of the spacer block 86 is a second pair of compound gears 96, each including a reduction gear 98 meshed with a pinion 94 of a corresponding compound gear 90. The compound gears 96 in turn include integral pinions 100 inwardly directed. Noting the detail of FIG. 5, the outer face of the reduction gear 98 of one of the compound gears 96 is provided with an outwardly directed pin 102 which rotatably aligns with an abutment or abutment pin 104 on and inwardly directed from the inner face of spacer block 86, providing for a rotational limit to the associated compound gear 96, and hence the gears drivingly associated therewith.

The pinion 100, associated with the compound gear 96 incorporating the limit pin 102, meshes with reduction gear 106 of a compound gear 108 which includes an integral pinion gear 110.

A compound gear 112 is provided as a companion to the compound gear 108 and includes reduction and pinion gears 114 and 116 of equal size as gears 106 and 110 respectively and joined by an internal coiled torsion spring 115 therebetween. The two pinion gears 110 and 116 mesh in driving engagement with the cam gear 70 whereby a rotation of the gear box assembly 80 in its entirety will effect a direct or coarse adjustment of the cam shaft 66. On the other hand, operation of the gear trains, through a rotational driving of driveshaft 74, will effect a fine or vernier rotation of the cam pinion 70 and cam shaft 66.

The use of dual gear trains is significant in stabilizing and enhancing the precision of the vernier adjustment. A significant further contribution is derived from the spring loaded compound gear 112 in that the coiled torsion spring 115, acting to resiliently bias the associated gears 114 and 116 in opposite directions, maintains both these two gears, and through them all of the gears of the assembled system, in intimate seated or meshed engagement. This in turn removes any tendency for backlash or lost motion within the gear train system, while at the same time allowing for manufacturing tolerances and avoiding the necessity of the use of high precision formed gears. It will also be recognized that the construction, as proposed, will provide for an automatic accommodation of some degree of system wear.

An inner handwheel 118, for coarse adjustment, is telescopically received over the gear box assembly 80, defining in effect a housing therefor. The gear box assembly 80 is secured to and within the inner handwheel 118 by appropriate threaded fasteners 120 engaged through the inner gear box plate 82 and a plate supporting shoulder or pair of opposed shoulders 122 interiorly of the handwheel 118. The handwheel 118 can include an inwardly directed alignment pin 124 receivable through a guide aperture 126 in the inner mounting plate 82 to provide rotational limits when engaged with two pins 160 mounted outwardly in plate 56. The gear box assembly 80 with the handwheel 118 attached is then secured to the quill shaft 64 with set screws 161. An outer handwheel 128, for fine or vernier adjustment, is secured to the outer end portion of the central driveshaft 74 outward of drive pinion 78. The handwheel 128 is mounted between an outer retaining clip 130 and multiple annular or disc springs 132 engaged between the pinion 78 and the inner face of the vernier handwheel 128. Mounted in this manner, the outer handwheel 128, upon the introduction of a rotational overload, will tend to slip rather than overextend the capability of the gear train.

It will also be noted that the outer handwheel 128 includes an inwardly directed annular flange or skirt 134 which is received within an outwardly directed annular groove 136 about the inner handwheel 118, thus providing for a rotatable mating therebetween in a manner which allows for a rotation of the handwheels independently with each other in conjunction with a retention of the inner handwheel 118 by the outer handwheel 128.

Turning now to the right hand portion of FIG. 2, inner and outer handwheels, 138 and 140 respectively, are provided to duplicate the adjustment capability of the handwheels 118 and 128. The auxiliary inner handwheel 138, for coarse adjustment, is locked to the quill shaft 64 for a direct rotation thereof and the cam shaft 66 therewith. The outer auxiliary handwheel 140, for fine or vernier adjustment, mounts to the inner driveshaft 74 for direct rotation thereof and the gear train system therethrough. The auxiliary outer handwheel 140 is clip and spring mounted in the manner of the handwheel 128. Appropriate annular or disc spring assemblies 142, engaged with the opposed faces of the inner handwheel 138 and incorporating one or more shaft-mounted clips 144, are also present and provide a braking action holding the adjusted position of the inner handwheels 118 and 138 during rotation of the outer handwheels 128 and 140.

In operation, rotation of either or both inner handwheels 118 and 138 effect a direct rotation of the cam shaft 66 and cam 42 for a coarse adjustment of the vertically movable support assembly. It should be appreciated that the cam 42, acting on the follower 40, operates to elevate the nosepiece. Lowering of the nosepiece will normally be effected by the weight of the support assembly itself, as the cam 42 is rotated in the opposite direction.

When fine adjustment of the vertical position of the nosepiece is desired, the inner handwheels 118 and 138 are released and the outer handwheels 128 and 140, individually or together, rotated. Rotation of these handwheels effects a direct rotation of the driveshaft 74 and drive pinion 78. This in turn drives the gear trains within the gear box assembly and, in turn, the cam pinion 70. Rotation of the gear trains will be limited by limit pin 102 engaging abutment 104 to ten turns of the outer handwheels 128 and 140.

As previously indicated, a particularly significant feature of the invention is the ready accessibility of the gear box assembly and gear train system itself for servicing or replacement without necessitating a disassembling of the microscope frame and with little or no interruption. From the above detailed description of the construction involved, it will be appreciated that, basically, upon a removal of the outer retaining clips which retain the outer handwheels 128 and 140, and loosening the set screw 161 in gear box 80, the remaining operating components, including the inner handwheels and gear box assembly, can be easily slipped from the mounting shafts. Similarly, the central driveshaft 74 itself can be easily withdrawn. Should the gear box assembly or gear trains require servicing, a substitute assembly can be quickly slid into position, the handwheels remounted and the entire apparatus put back into service with only a few moments delay and no appreciable downtime. The gear box assembly is self-contained and, through the torsion loaded nature of one of the compound gears, readily engaged in operative relationship with the cam gear 70.

The foregoing description of an embodiment of this invention is given by way of illustration and not of limitation. The concept and scope of the invention are limited only by the following claims and equivalents thereof which may occur to others skilled in the art.

I claim:

1. A microscope having a frame comprising a base and an arm assembly extending upwardly therefrom, a nosepiece, and an adjustment system for moving said nosepiece relative to said arm assembly, said adjustment system including:
   a nosepiece support mounted on said arm assembly for movement relative thereto,
   a cam shaft rotatably mounted on said frame, a cam fixed to said cam shaft for rotation therewith, said cam being operatively engaged with said nosepiece support for movement thereof to effect adjustment of said nosepiece, said cam shaft having a free drive end remote from said cam,
   a reduction gear train system releasably engaged with the free drive end of said cam shaft for rotation thereof and selective direct removal therefrom, said gear train system comprising multiple drivingly engaged gears,
   a gear box mounting said reduction gear train system,
   a coarse adjustment handwheel mounted to said gear box whereby rotation of said coarse adjustment handwheel is effective to rotate said gear box, gear train system, cam shaft and cam as a unit, said coarse adjustment handwheel, gear box and gear train system being removable as a unit from the drive end of said cam shaft,
   a gear train drive shaft operatively engaged with the gears of said gear train system, and
   a vernier handwheel mounted to said gear train drive shaft whereby rotation of said vernier handwheel is effective to rotate the gears of said gear train system with a resultant rotation of the cam shaft and cam.

2. The apparatus defined in claim 1 wherein the free drive end of said cam shaft includes a cam shaft pinion, said gear train system slidably engaging with said cam shaft pinion.

3. The apparatus defined in claim 2 wherein said cam shaft extends transversely within said arm assembly with the free drive end and cam shaft pinion positioned outward of the arm assembly.

4. The apparatus defined in claim 3 wherein said arm assembly includes opposed walls, a quill shaft traversing said arm assembly between said opposed walls, said quill shaft including a first end portion extending beyond a first of said walls, said cam shaft encircling a portion of the length of said quill shaft at said first end portion, and permitted to rotate relative to the quill shaft.

5. The apparatus defined in claim 4 wherein said quill shaft includes a second end portion extending beyond the second of said walls, and an auxiliary coarse adjustment handwheel fixed to the second end of said quill shaft for rotation thereof and the cam shaft therewith.

6. The apparatus defined in claim 5 wherein said drive shaft is removably received through said quill shaft, said drive shaft having a first end portion projecting beyond the first end portion of said quill shaft and including a drive pinion thereon, said drive pinion engaging said gear train system, said vernier handwheel removably mounting on said drive shaft first end portion outward of the drive pinion.

7. The apparatus defined in claim 6 wherein the vernier handwheel rotatably engages said coarse adjustment handwheel and retains said coarse adjustment handwheel and gear box with the gear train system engaged with the cam shaft pinion.

8. The apparatus defined in claim 7 wherein said drive shaft includes a second end portion projecting beyond the second end portion of the quill shaft, and an auxiliary vernier handwheel mounted to the second end portion of the drive shaft for a rotation thereof.

9. The apparatus defined in claim 1 wherein said arm assembly includes opposed walls, a quill shaft traversing said arm assembly between said opposed walls, said quill shaft including a first end portion extending beyond a first of said walls, said cam shaft encircling a portion of the length of said quill shaft at said first end portion, and the cam shaft permitted to rotate relative to quill shaft.

10. The apparatus defined in claim 9 wherein said quill shaft includes a second end portion extending beyond the second of said walls, and an auxiliary coarse adjustment handwheel fixed to the second end of said quill shaft for rotation thereof and the cam shaft therewith.

11. The apparatus defined in claim 10 wherein said drive shaft is removably received through said quill shaft, said drive shaft having a first end portion projecting beyond the first end portion of said quill shaft and including a drive pinion thereon, said drive pinion engaging said gear train system, said vernier handwheel removably mounting on said drive shaft first end portion outward of the drive pinion.

12. The apparatus of claim 1 including a drive pinion on said gear train drive shaft and a cam gear on said cam shaft, said gear train system including first and second compound gears positionable in direct driven engagement with said drive pinion, third and fourth compound gears in driven engagement respectively with the first and second compound gears, each of said third and fourth compounds gears comprising a reduction gear and a reduced diameter pinion integral therewith, and fifth and sixth compound gears, said fifth compound gear including a reduction gear in driven engagement with the pinion of said third compound gear, and an integral pinion positionable in driving engagement with said cam gear, said sixth compound gear comprising a reduction gear in driven engagement with the pinion of the fourth compound gear, a drive pinion positionable in driving engagement with the cam gear, and a limited movement coupling between the reduction gear and the pinon gear of the sixth compound gear.

13. The apparatus of claim 12 including a limit means on said gear train limiting rotational driving of the gears thereof to ten turns of the vernier handwheel.

14. The apparatus of claim 13 wherein said limit means comprises a limit pin on one of said gears and a selectively engageable abutment rigid with said gear box.

15. A microscope having a frame comprising a base and an arm assembly extending upward therefrom, a nosepiece, and an adjustment system for moving said nosepiece relative to said arm assembly, said adjustment system including a nosepiece support mounted on said arm assembly for movement relative thereto, a cam shaft rotatably mounted on said frame, a cam fixed to said cam shaft for rotation therewith, said cam being operatively engaged with said nosepiece support for movement thereof to effect adjustment of said nosepiece, said cam shaft having a free drive end remote from said cam shaft, a gear train system releasably engaged with the free drive end of said cam shaft for rotation thereof and selective direct removal therefrom, a gear train drive shaft operatively engaged with said gear train system, said gear train system including a drive pinion on said gear train drive shaft and a cam gear on said cam shaft, said gear train system including first and second compound gears positionable in direct driven engagement with said drive pinion, third and fourth compound gears in driven engagement respectively with the first and second compound gears, each of said third and fourth compounds gears comprising a reduction gear and a reduced diameter pinion integral therewith, and fifth and sixth compound gears, said fifth compound gear including a reduction gear in driven engagement with the pinion of said third compound gear, and an integral pinion positionable in driving engagement with said cam gear, said sixth compound gear comprising a reduction gear in driven engagement with the pinion of the fourth compound gear, a drive pinion positionable in driving engagement with the cam gear, and a limited movement coupling between the reduction gear and the pinion gear of the sixth compound gear.

16. The apparatus of claim 15 including a limit means on said gear train limiting rotational driving of the gears thereof to ten turns of the vernier handwheel.

17. In a microscope construction having a nosepiece, a support system for said nosepiece movable to effect vertical focusing adjustment of said nosepiece, a driven assembly operatively engaging said support system for effecting a focusing adjustment movement of said support system in response to movement of said driven assembly, and a coarse and fine adjustment mechanism in driving engagement with said driven assembly; the improvement comprising said adjustment mechanism including dual multiple gear trains independently and simultaneously engageable with said driven assembly for a common driving thereof and a drive element engageable with both gear trains for a simultaneous driving of both gear trains and a driving of the driven assembly therethrough.

18. The apparatus of claim 17 wherein said driven assembly comprises a rotatable cam shaft, a cam fixed to said cam shaft for rotation therewith, and a pinion gear rigid with said shaft and engageable by said gear trains.

19. The apparatus of claim 17 wherein each of said gear trains comprises multiple engaged gears, one of said gear trains includes means for resiliently biasing selected gears relative to each other during operation of the gear train to maintain a preload on the gears thereof.

20. The apparatus of claim 19 wherein said means comprises a torsion spring engaged with and between said selected gears.

* * * * *